United States Patent

Schaus

[15] 3,650,200
[45] Mar. 21, 1972

[54] APPARATUS FOR FERMENTING BREWER'S WORT

[72] Inventor: Orland Otto Schaus, Don Mills, Ontario, Canada

[73] Assignee: Canadian Breweries Limited, Toronto, Ontario, Canada

[22] Filed: Oct. 10, 1969

[21] Appl. No.: 865,238

[30] Foreign Application Priority Data

Dec. 30, 1968 Canada.................................038922

[52] U.S. Cl................................................99/277.2, 99/31
[51] Int. Cl. ...................................................C12h 1/22
[58] Field of Search ....................99/276, 277, 277.1, 277.2, 99/348; 259/9, 10, 109, 110, 46, 45, 68, 69, 25, 26

[56] References Cited

UNITED STATES PATENTS

| | | | |
|---|---|---|---|
| 1,563,101 | 11/1925 | Offenhauser | 259/46 |
| 2,872,166 | 2/1959 | Roberts | 259/9 |
| 3,215,408 | 11/1965 | Hansen | 259/9 |
| 3,272,649 | 9/1966 | Huser | 259/10 |

Primary Examiner—Robert Jenkins
Attorney—Fetherstonhaugh & Co.

[57] ABSTRACT

This invention relates to the manufacture of alcoholic brewery beverages on a continuous basis and is concerned with a novel fermenting vessel and novel fermentation process involving its use. The fermenting vessel has a series of compartments through which the brewer's wort flows in use. The bottom of the vessel has a rounded bottom in cross-section and a longitudinally extending paddle rotates close to the rounded bottom at a slow rate sufficient only to keep yeast from settling on the bottom during the fermentation process. This limited agitation has been found to be as effective as the rapid agitation from a time point of view and produces end product that is superior in taste to one that is rapidly agitated.

2 Claims, 1 Drawing Figure

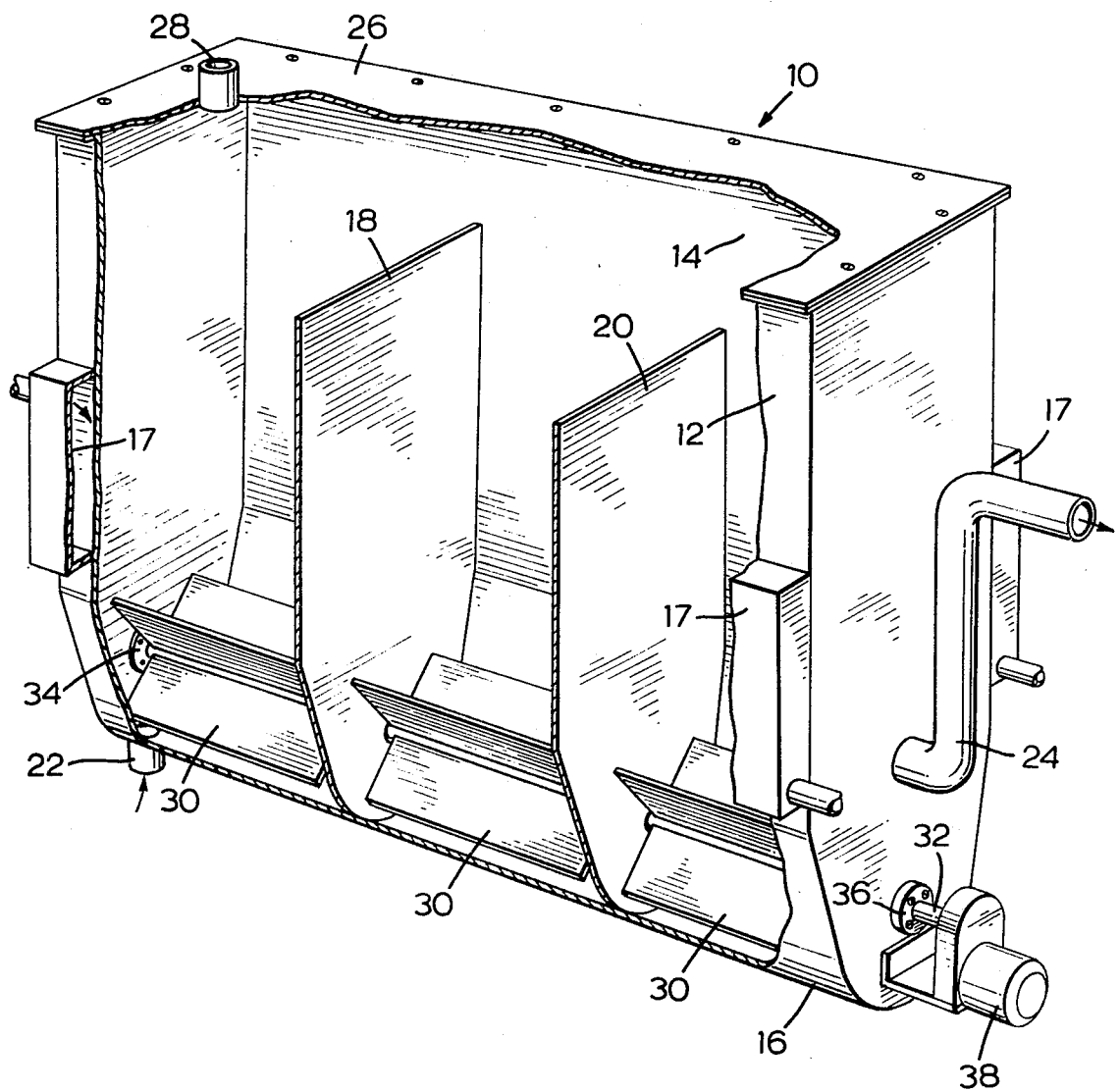

_3,650,200_

APPARATUS FOR FERMENTING BREWER'S WORT

This invention relates to a method of fermenting brewer's wort in the manufacture of alcoholic brewery beverages and to apparatus for fermenting brewer's wort.

Over the past 10 years, considerable development work has been carried out and progress has been made in the manufacture of alcoholic brewery beverages on a continuous as distinct from a batch basis. The continuous method of making beer has substantial economic advantages over the batch process, but there has been a reluctance by consumers and also by manufacturers to accept the products of the continuous process because they tend to have flavors that are different to the batch produced product. For this reason, manufacturers have not adopted continuous processes to the extent that they might be inclined to otherwise, having regard to the economic advantages of the continuous process.

It is felt that differences in flavor between beer manufactured on the continuous process and the batch process is to a large extent caused by the differences in the fermentation step wherein brewer's wort is continuously passed through a fermenting vessel and is reduced in gravity the desired amount on its passage through so that, on leaving the vessel, it has the desired alcoholic content of beer.

As indicated above, the advantages of the continuous process are mainly economic ones. The product can be manufactured more economically and at a lesser cost. A material factor in cost is production time, and it is customary in the continuous fermentation of brewer's wort to rapidly agitate the wort in order to keep the yeast in suspension. High speed turbines or anchor type agitators are customarily operated in the baffled fermenting vessel.

I have discovered that it is the rapid agitation of the wort during the fermentation process that causes many of the poor flavor characteristics of continuously fermented beer. The rapid agitation that is used to mix the wort and keep the yeast in suspension requires considerable power supply to the agitators and results in heavy sheer forces on the yeast particles as a result of the heavy agitation.

On the other hand, if no agitation is used, the yeast tends to settle on the bottom of the fermenting vessel, especially towards the end of the fermentation cycle, and the fermentation rate becomes extremely slow and, therefore, uneconomic.

I have found that a fast fermentation time can be achieved by applying just enough agitation to the yeast to keep the yeast from settling on the bottom of the vessel. There is no need to agitate the entire body of wort. A good fermentation rate can be maintained by agitating the lower portion of the fermentation vessel sufficiently to keep the yeast from settling on the bottom and to carry it upwardly into the body of the wort, where it is then kept in contact with the wort primarily by the action of the $CO_2$ that is released during the fermentation process. The agitation is primarily for the purpose of keeping the yeast from settling and not to maintain the body of wort in an agitated condition.

It is, therefore, an object of this invention to provide a method of fermenting brewer's wort that does not materially reduce the fermentation time from the fermentation time of a rapidly agitated continuous fermenting operation and that, at the same time, produces a beer having a better flavor and a flavor that is more like the conventionally produced batch fermented product.

It is a further object of the invention to provide novel apparatus for continuously fermenting brewer's wort to beer.

Generally speaking, the method of fermenting according to the invention is a continuous method wherein wort and yeast are conducted through a fermenting vessel having a series of fermenting compartments in a period of time sufficient to provide the desired reduction in gravity at the temperature and pitching rate selected. The improvement comprises the stirring of the wort at the bottom portion of the vessel at a rate great enough to carry yeast tending to settle on the bottom of the vessel upwardly of the stirring means employed a distance short of the top surface of wort in the fermenting vessel.

The apparatus used consists of a fermenting vessel comprising an elongated vessel with opposed side walls that become more closely spaced apart at their lower portions and communicate with a bottom. The bottom is rounded in transverse cross section. Paddle means are provided and means for rotatably mounting the paddle means are provided. Means are also provided for rotating the paddle means in a path that carries the extremities thereof in close spaced relation to the rounded bottom at a speed to keep yeast from settling on the bottom portion of the tank, and to carry the yeast upwardly into the body of wort a distance short of the top surface of the wort.

The invention will be clearly understood after reference to the following detailed specification read in conjunction with the drawings.

In the drawings,

FIG. 1 is a perspective view of a fermenting vessel according to this invention.

As indicated above, this invention is concerned with the continuous fermentation of wort. The wort to be fermented will probably be the product of a continuous mashing operation, but it need not be. The wort could be produced by batch process. This invention is concerned only with the fermenting stage of the beer making process and the source of the wort that is fed to the fermenting vessel is unimportant.

The fermenting vessel is illustrated in the drawings. It comprises an elongated tank, generally indicated by the numeral 10, having opposed side walls 12 and 14 that become more closely spaced apart at their lower portions and communicate with a bottom 16 that is round in transverse cross section. Numeral 17 indicates cooling jackets which are used according to standard brewing practice. The tank is divided into three compartments by means of baffles 18 and 20 in order to prevent back mixing of the wort as it travels through the fermentation vessel from the wort inlet 22 to the beer outlet 24. It will be noted that baffle 20 is lower than baffle 18 so that, in use, as the wort travels through the vessel, it spills over baffle 18 first and then over baffle 20. The use of baffles in fermentation vessels is not new and no claim is being made to their novelty in this application. The fermentation vessel has a top 26 that is provided with a $CO_2$ exhaust vent 28, again according to standard fermentation practice.

As indicated above, the novelty in this invention is centered around the means for sweeping the bottom area of the fermenting vessel and the step of operating the sweeping means to stir the wort at the bottom portion of the vessel at a rate great enough to carry yeast tending to settle on the bottom of the vessel upwardly of the stirring means employed a distance less than the total depth of the fermenting vessel, and, in this connection, there is provided in each of the compartments rotating paddles 30, which are mounted on shaft 32 that is journaled in the ends of the fermenting vessel as at 34 and 36 and that can be driven by means of motor 38 at a slow rate of speed sufficient only to prevent yeast that tends to fall out of the solution of the wort to the bottom of the vessel from settling on the bottom of the vessel.

The speed of rotation of the paddles 30 is not, for example, sufficiently high to agitate the body of the wort sufficiently to carry the yeast particles that tend to settle up to the surface of the wort. The only function of the paddles is to agitate the wort sufficiently to carry the settling yeast away from the bottom of the fermenting vessel. It has been found that if this assist is provided, the evolution of $CO_2$ during the fermentation process is sufficient to maintain the yeast in suspension to a degree to achieve substantially as fast a fermentation rate as was previously obtained with agitation of the wort that agitated the whole body of wort.

The fermenter illustrated is a 200 gallon capacity having a width at the top of about 2 feet, a length of about 6 feet and a depth to the point where the side walls begin to taper inwardly of about 4 feet.

A rotational speed of the paddles 30 of about 7 r.p.m. is fast enough to lift yeast from the bottom so that the carbon dioxide evolved during the fermentation process can take over and maintain it in sufficient contact with the wort to achieve a good fermentation time with a flavor of end product that is similar to the batch produced product. The rotation of about this speed tends to carry the yeast upwardly about a foot from the paddles and it does not harmfully affect the yeast by the application of physical force. Variations of the speed of the paddle and, of course, of the paddle size are possible. Increase of the speed to 15 r.p.m. would not materially affect the operation of the process. The thing to be avoided is a heavy agitation of the body of wort because this agitation involves interface action of the yeast particles under the force of mechanical agitation that tends to affect flavor adversely. It has been found that such complete agitation is not necessary and that the lesser agitation of this invention will achieve an improved product.

Following are examples of this process. Aerated wort and yeast were introduced through the inlet 22 of the fermenter and a through flow on a continuous basis from the inlet to the outlet 24 in a period of about 10 hours was maintained. Yeasting rate was adjusted so that the gravity in the first chamber was about 5.5 Balling, the gravity in the second chamber was about 3.5 Balling, and the gravity at the outlet was about 2.6 Balling. The fermentation temperature was 68° F. and a yeast pitching rate of about 50 grams per liter was maintained by adjusting of the yeast content at the input. The end product had a good taste comparable to a batch produced beer.

Variations in the fermenting conditions are, of course, possible. A satisfactory fermentation was also run at a pitching rate of about 20 grams per liter in about 32 hours at a temperature of about 65° F. The wort in this example was the same as the wort in example 1.

Satisfactory result has also been obtained at a yeast pitching rate of 10 grams per liter with the same wort as in the first example at a fermentation time of about 60 hours and a temperature of about 65° F.

Pitching rates for the yeast are variable according to brewing practice.

Embodiments of the invention other than the one described will be apparent to those skilled in the art, and it is not intended that the foregoing specification be read in a limited sense.

I claim:

1. A fermenting vessel for continuously fermenting brewer's wort to beer comprising an elongated vessel having two end walls and opposed side walls that become more closely spaced apart at their lower portions and communicate with a bottom, said bottom being rounded in transverse cross section; paddle means, means for mounting said paddle means along an axis of rotation that aligns with the longitudinal axis of said vessel, said paddle means having a length and being adapted to rotate in a path that carries the extremities thereof in close relation to said rounded bottom, drive means for rotating said paddles at a rate sufficiently only to keep yeast from settling on the bottom portion of said tank, an input opening adjacent one of said end walls, said latter mentioned end wall being at the input end of said vessel, an output opening adjacent the other one of said end walls, said latter mentioned end wall being at the output end of said vessel, a series of baffles dividing said vessel into a series of compartments that extend from the input end to the output end of said vessel, said series of baffles decreasing progressively in height from the input end towards the output end of said vessel, each of said compartments communicating with its next following compartment in said series over one of said series of baffles.

2. A fermenting vessel as claimed in claim 1, in which said paddle means extend substantially for the full length of said bottom.

* * * * *